W. K. CHASE.
Velocipede.
No. 53,572. Patented Apr. 3, 1866.
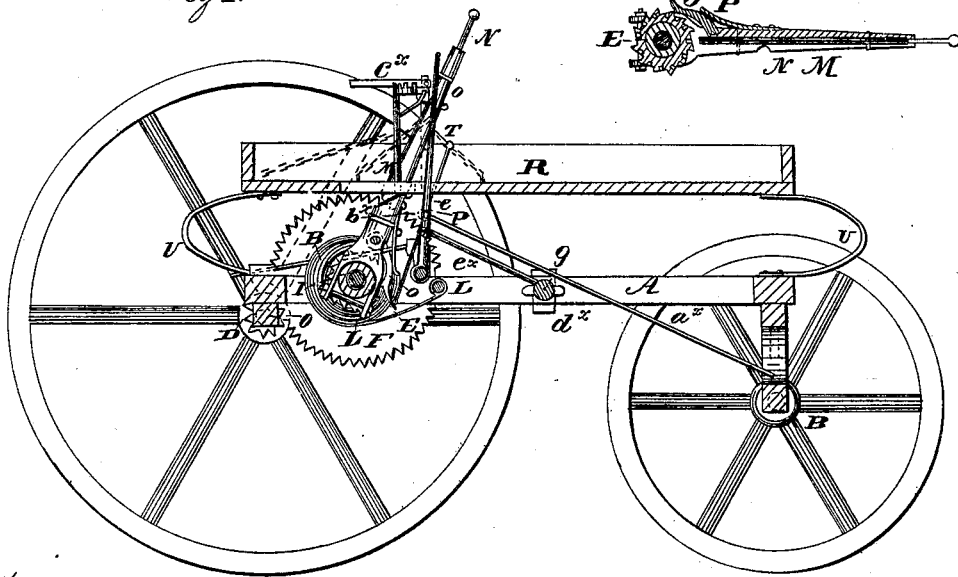
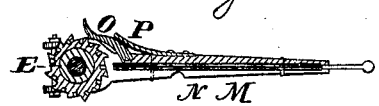
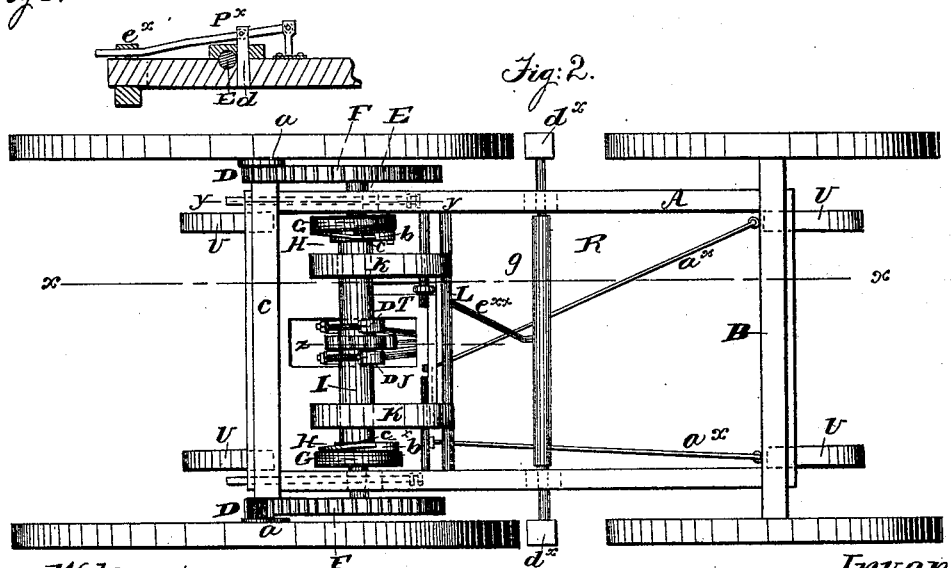
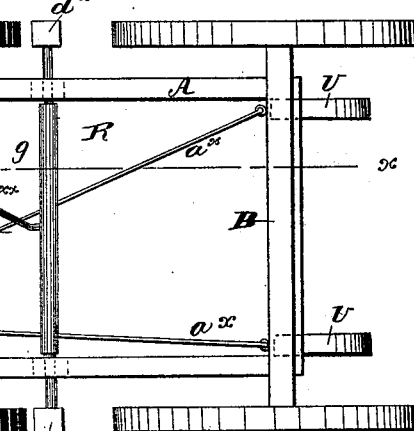
Witnesses:
Inventor:
William K. Chase
Per Munn & Co
att'ys

UNITED STATES PATENT OFFICE.

WM. K. CHASE, OF CHARLESTOWN, MASSACHUSETTS.

IMPROVEMENT IN SPRING-POWER FOR PROPELLING CARRIAGES.

Specification forming part of Letters Patent No. 53,572, dated April 3, 1866.

*To all whom it may concern:*

Be it known that I, WILLIAM K. CHASE, of Charlestown, in the county of Middlesex, and State of Massachusetts, have invented a new and Improved Spring-Power for the Propulsion of Pleasure-Wagons; and I do hereby declare that the following is a full, clear, and exact description thereof, which will enable those skilled in the art to make and use the same, reference being had to the accompanying drawings, forming part of this specification, in which—

Figure 1 is a side sectional view of my invention, taken in the line $x\,x$, Fig. 2; Fig. 2, an inverted plan of the same; Fig. 3, a vertical section of a portion of the same, taken in the line $y\,y$, Fig. 2; Fig. 4, a vertical section of a portion of the same, taken in the line $z\,z$, Fig. 2.

Similar letters of reference indicate corresponding parts.

This invention relates to a new and useful application of spring-power to a pleasure-wagon, as hereinafter fully shown and described, whereby a wagon may be propelled along on ordinary roads, and the spring or springs wound up from time to time, as occasion may require, without any trouble; the wagon also being capable of being backed, turned, and otherwise controlled in its movements as well as those drawn by animals.

A represents a horizontal frame, which may be of rectangular form, and mounted on wheels in precisely the same way as an ordinary pleasure-wagon, the front axle, B, turning on a king-bolt, and the rear axle, C, being fixed.

The hubs $a$ of the hind wheels have pinions D on them; and in the frame A, directly in front of the axle C of the hind wheels, there is placed transversely a shaft, E, on each end of which a wheel, F, is keyed. These wheels F F, when the wagon is propelled forward under the action of the springs, hereinafter described, gear into the pinions D D on the hubs $a$ of the hind wheels.

The shaft E is allowed to slide to a certain extent in its bearings, so that the wheels F F may be thrown in and out of gear with the pinions D D; and there are two wheels, G G, placed and firmly keyed on the shaft E, each having a pawl, $b$, attached, with springs $c$ bearing against them. These pawls $b$ engage with or work into ratchets H H at the ends of a drum, I, which is fitted loosely on the shaft E and has a ratchet J secured upon it at its center, and the shaft E has the inner ends of two coil-springs, K K, attached to it, the outer ends of which are secured to a cross-shaft, L, in the frame A.

On the shaft E, at each side of the ratchet J, there is fitted loosely a yoke, L, said yokes extending above the ratchet and connected to or forming a part of a common lever, M, in which a sliding rod, N, is fitted. To this lever M there is attached a pawl, O, which is kept in contact with the ratchet J by means of a spring, P, and a rod, $e$, is attached to the pawl O for the purpose of disengaging the pawl from the ratchet when required.

From the above description, it will be seen that by working the lever M the pawl O will, in consequence of being engaged with the ratchet J, wind up the coil-springs K K, and when the latter are wound up the pawl O is raised and the springs K will turn the drum I, and the latter will turn the shaft E, through the medium of the ratchets H H and pawls $b\,b$ on the wheels G G, the power being communicated to the hind wheels through the medium of the toothed-wheels F and the pinions D on the hubs $a$.

The springs K K, as they are wound up, have a tendency to draw the shafts E forward and throw the wheels F F out of gear with the pinions D on the hubs $a$; this is prevented, when necessary, by means of keys $d$, attached or pivoted to levers $P^\times$, the keys, by depressing the levers $P^\times$, being forced down in front of the shaft E, as shown in Fig. 3. By raising these keys the shaft E will move forward, and the wheels F thrown out of gear with the pinions D. The levers $P^\times$ may be kept down by means of buttons $e^\times$.

In ascending eminences where the springs K would need assistance, the rod N may be shoved down in the lever M and made to engage with the ratchet J by having its lower end fitted in a hole therein. Then by working the lever M the springs will be assisted.

When it is necessary to back the wagon, the keys $d$ are raised so that the wheels F will be thrown out of gear with the pinions D, and the wagon may then be pushed backward. This, however, will be rarely necessary, as the invention is designed simply for pleasure traveling on smooth roads and short distances.

The front axle may be turned by rods $a^\times$ attached to it and to the ends of an arm, $b^\times$, which passes through a vertical shaft, Q, extending up through the bottom of the wagon-body R, said shaft being provided with a lever, $c^\times$, at its upper end for the convenience of turning it.

I design to use a brake composed of shoes $d^\times$ attached to the ends of a bar, S, passing transversely through the frame A, said bar being allowed to slide forward and backward a suitable distance, and connected by a rod, $e^{\times\times}$, with a lever, T, which also passes up through the body R. This body R may rest on springs U attached to frame A.

Having thus described my invention, I claim as new and desire to secure by Letters Patent—

1. The springs K K, one or more, applied to a drum, I, placed loosely on a shaft, E, to which wheels F F are attached, in connection with the pinions D on the hubs $a$ of the hind wheels of the wagon, the ratchets H H and J on drum I, the yokes L L, lever M, and sliding rod N, and the pawls $b\ b$ on the wheels G G of shaft E, all arranged and applied to operate in the manner substantially as and for the purpose specified.

2. Arranging the shaft E so that it will have a forward and backward movement in its bearings, to admit of the wheels F being moved in and out of the gear with the pinions D when said shaft, thus arranged, is used in connection with the keys $d\ d$ of the levers P, and the springs K K, with their outer ends attached to the frame A, or to the fixture thereof, substantially as described.

WM. K. CHASE.

Witnesses:
 AMOS SMITH,
 PHILIP McGRATH.